United States Patent Office 3,146,260
Patented Aug. 25, 1964

3,146,260
ORGANOBORON TERPOLYMERS AND THE PREPARATION THEREOF FROM OLEFINIC CARBORANE COMPOUNDS
John W. Ager, Jr., Princeton, N.J., and Sheldon L. Clark, Orange, and Theodore L. Heying, North Haven, Conn., assignors to Olin Mathieson Chemical Corporation
No Drawing. Filed Dec. 14, 1960, Ser. No. 75,874
5 Claims. (Cl. 260—537)

This invention relates to novel organoboron terpolymers and to a method for their preparation. More in particular, this invention relates to the preparation of vinylcarborane-allylcarborane-isopropenylcarborane carboxylic acid terpolymers which are useful as fuels for solid propellants. In addition, this invention also relates to solid compositions containing the said organoboron terpolymers and to a method for their preparation.

Compounds of the carborane class can be prepared by the reaction of decarborane or an alkylated decarborane having one to two alkyl groups containing 1 to 5 carbon atoms in each alkyl group with an acetylenic hydrocarbon containing from two to ten carbon atoms in the presence of a wide variety of ethers, nitriles, amines or sulfides. The preparation of these compounds which include isopropenylcarborane, vinylcarborane and allylcarborane is described in application Serial No. 813,032, filed May 13, 1959, of Ager, Heying and Mangold. For example, vinylcarborane, $B_{10}H_{10}CHCHC=CH_2$, can be prepared by reacting vinyl acetylene, decarborane, diethyl sulfide and benzene for about 8 hours at reflux temperature. Allylcarborane, $B_{10}H_{10}CHCCH_2CH=CH_2$, and isopropenylcarborane, $B_{10}H_{10}CHCCH_3C=CH_2$, are obtained in the same general manner. Isopropenylcarborane carboxylic acid, $B_{10}H_{10}C(CH_3C=CH_2)C(COOH)$, can be prepared in the manner described in application Serial No. 809,569, filed April 28, 1959, of Ager, Alexander and Heying. In general isopropenylcarborane carboxylic acid can be prepared by reacting isopropenylcarborane successively with n-butyl lithium, carbon dioxide and an aqueous solution of a mineral acid for about two hours at about −15° C.

Hereinafter, in the specification and claims, the term vinylcarborane refers to the compound $$B_{10}H_{10}CHCHC=CH_2$$

the term allylcarborane refers to the compound $$B_{10}H_{10}CHCCH_2CH=CH_2$$

and the term isopropenylcarborane carboxylic acid refers to the compound $B_{10}H_{10}C(CH_3C=CH_2)C(COOH)$.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling. The viscous, semi-solid polymers produced according to the process of this invention can be cured to form solid products.

In accordance with the present invention, it has been discovered that vinylcarborane, allylcarborane and isopropenylcarborane carboxylic acid can be polymerized to produce valuable organoboron terpolymers. The novel terpolymers of this invention may be synthesized from mixtures of the monomers by any of the known polymerization procedures including solution polymerization, mass or bulk polymerization and polymerization in aqueous suspension or emulsion, in the presence of a dispersing or emulsifying agent, the suspension or emulsion being maintained by any agitation method, as for example, by tumbling in a rotating reactor, or through the use of any suitable rotary stirring device.

The polymerization reaction may be catalyzed by means of any free radical-producing catalyst. Suitable catalysts include the water-soluble peroxy compounds, for example, hydrogen peroxide, sodium peroxide, sodium perborate, sodium persulfate and other alkali metal salts of peroxy acids, or other water-soluble peroxy compounds. Other suitable catalysts include, for example, benzoyl peroxide, tertiary butyl peroxide, acetyl peroxide, acetyl benzoyl peroxide, potassium perborate, sodium percarbonate, potassium percarbonate, tertiary butylhydroperoxide, lauryl peroxide, acetone peroxide, cumene hydroperoxide, and homologues of isopropyl benzene hydroperoxide such as cymene. Azo catalysts, such as azo-2,2'-diisobutyronitrile may also be used advantageously. A wide variation in concentration of catalysts may be employed depending on the temperature of polymerization, the concentration of monomers in the reaction mass, and the molecular weight desired for the terpolymer. In general, the amount of catalyst employed can be varied widely from about 3 to about 15 percent by weight based on the total weight of the charge, with the preferred weight of catalyst being from about 5 to about 12 percent by weight based on the total weight of the charge. In addition, it is advantageous to have a uniform reaction rate and, therefore, a substantially uniform concentration of the catalyst is desirable throughout the reaction.

In the process of this invention the liquid reactants are charged to the reactor along with the catalyst. The mixture is brought rapidly to a suitable polymerization temperature, 125° to 225° C., preferably 150°–200° C. and the system is agitated for a period of from about 20 to about 75 hours. During the polymerization reaction the free space in the reactor is continuously purged with nitrogen.

The molar ratio of the vinylcarborane to allylcarborane employed in the polymerization reaction can be from about 1:5 to about 5:1. The amount of isopropenylcarborane carboxylic acid used can be varied widely from about 1 to about 15 percent by weight, based on the total weight of the allylcarborane and vinylcarborane charged to the reactor, with the preferred weight of the isopropenylcarborane carboxylic acid being from about 3 to 12 percent by weight based on the total weight of allylcarborane and vinylcarborane.

The physical properties, especially the viscosity and molecular weight, of the terpolymers of this invention are considerably affected by changing the reaction conditions.

In general, terpolymers ranging from liquids to very viscous semi-solids can be produced by the process of this invention.

The process of this invention is illustrated in detail by the following examples. In the examples, the term "moles" signifies gram moles.

EXAMPLE I

To a one-pound, glass, resin kettle, 65.0 grams of vinylcarborane which had been recrystallized from a menthanol-water mixture, an equal molar quantity of allylcarborane, 70.2 grams, 13.5 grams of isopropenylcarborane carboxylic acid (10 percent based on the combined weight of allylcarborane and vinylcarborane), and 8.5 grams of tertiary butyl peroxide (6.3 percent based on the combined weight of the allylcarborane and vinylcarborane) were added.

The resin kettle was equipped with a top-entering, glass, anchor-shaped stirrer. A nitrogen source was connected to an adapter in the kettle top while a similar adapter in the kettle top was connected by the nitrogen outlet line to a bubble-off containing mineral oil. During the entire experiment the free space over the charge was swept with a stream of nitrogen. The resin kettle was placed in an oil bath and after the oil bath temperature had been slowly brought up to 170° C.±5° C., it was maintained at this temperature for 24 hours. Upon cooling to room temperature the reaction mixture became slightly viscous. An additional 2.5 grams of tertiary butyl peroxide wass added. The total amount of catalyst used was 11 grams which is 8.2 percent based on the combined weight of the allylcarborane and vinylcarborane. The oil bath was reheated to 170° C. and maintained at this temperature for an additional twelve hour period. Upon cooling the reaction mixture became somewhat viscous. An elemental analysis of the product showed that it contained 58.5 (58.4, 58.5) percent boron, 32.6 (32.1, 33.1) percent carbon and 8.4 (8.54, 8.34) percent hydrogen. The molecular weight was determined and found to be 11,500 and the viscosity by measurement was found to be 1500 centipoises at 70° C.

EXAMPLE II

In this experiment a 200 ml. Pyrex test tube having a 24/40 standard-taper joint at the top served as the reactor. The male section of this joint was formed into a top closure for the reactor. A nitrogen inlet adapter and a nitrogen outlet connection were also provided in the closure and, in addition, the reactor was equipped with a glass stirrer.

To this apparatus there was added 32.5 grams of vinylcarborane, 35.1 grams of allylcarborane, 6.7 grams of isopropenylcarborane carboxylic acid (10 percent based on the combined weight of the allylcarborane and vinylcarborane) and 5.5. grams of tertiary butyl peroxide (8.2 percent based on the combined weight of the allylcarborane and vinylcarborane). During the entire experiment the reaction mixture was stirred and nitrogen atmosphere was maintained over the system. The material was heated at 170° C.±5° C. in an oil bath for 24 hours and upon cooling to room temperature the reaction mixture became slightly viscous. The polymerization was repeated for an additional 12 hours. An analysis of the resultant product showed that it contained 56.1 (56.2, 56.0) percent boron, 34.5 (34.1, 34.8) percent carbon and 8.45 (8.46, 8.43) percent hydrogen. In addition it had the following properties:

Molecular weight _____ 2,960
Viscosity (centipoises) _____ 475; 460 at 70° C.
Density ($_4$.$^{20°}$ C.) _____ 0.947 g./cc.

EXAMPLE III

To the one pound, resin kettle previously described 65.0 grams of vinylcarborane, 70.2 grams of allycarborane, 13.5 grams of isopropylcarborane carboxylic acid (10 percent based upon the combined weight of allylcarborane and vinylcarborane) and 8.5 grams of tertiary butyl peroxide (6.3 percent based upon the combined weight of allylcarborane and vinylcarborane), were added. The apparatus was flushed with nitrogen and the mixture stirred. The temperature was raised to 170° C.±5° C. and maintained for 19 hours. After the heating was terminated and the reaction mixture cooled, an additional 2.5 grams of tertiary butyl peroxide was added. Then the reaction mixture was heated again to a temperature of 170°–175° C. which was maintained for a 6 hour period. An analysis of the resulting reaction product showed that it contained 59.2 (59.3, 59.0) percent boron 32.2 (32.0, 30.3, 34.2) percent carbon and 8.51 (8.66, 8.65, 8.23) percent hydrogen. In addition, it had the following properties:

Molecular weight _____ 6,150.
Viscosity (centipoises) _____ 598 at 70° C.
Density ($_4$.$^{20°}$ C.) _____ 0.954 g./cc.

EXAMPLES IV–XI

These examples, which are summarized in Table 1 were performed in the same general manner as the preceding examples and illustrate various embodiments which fall within the scope of this invention. Physical properties of some of the terpolymers prepared are shown in Table 2.

*Table 1*

| Example | Allyl-carborane (grams) | Vinyl-carborane (grams) | Isopropenyl-carborane Carboxylic Acid (grams) | t-Butyl Peroxide (grams) | Temperature (°C.) | Time (hours) | Boron (percent) | Carbon (percent) | Hydrogen (percent) |
|---|---|---|---|---|---|---|---|---|---|
| IV | 75.7 | 70.1 | 7.3 | 8.7 | 170–185 | 25 | 59.3 59.0 | | |
| V | 54.7 | 50.4 | 3.1 | 6.3 | 170 | 23 | 57.3 57.2 | | |
| VI | 37.9 | 35.0 | 3.6 | 4.5 | 170 | 24 | | | |
| VII | 37.9 | 35.0 | 7.3 | 4.5 | 170 | 24 | | | |
| VIII | 37.9 | 35.0 | 7.3 | ¹ 6.0 | 170 | 40 | | | |
| IX | 211.0 | 195.0 | 40.5 | ² 25.5 | 170 | 22 | 59.0 | | |
| X | 211.0 | 200.0 | 41.0 | 38.0 | 170 | 65 | 58.2 | 33.7 | 8.3 |
| XI | 70.2 | 65.0 | 13.5 | ³ 11.3 | 170 | 40 | | | |

¹ Added 4.5 grams at start of reaction and 1.5 grams after 24 hours.
² Added 12.75 grams at start of reaction and the other 12.75 grams after 4 hours.
³ Added 3.8 grams at start of reaction, after 5 hours and the remaining 3.7 grams after 24 hours.

*Table 2*

PHYSICAL PROPERTIES OF THE TERPOLYMERS

| Example | Molecular Weight | Density (gm./cc.) | Viscosity (centipoises at 70° C.) |
|---|---|---|---|
| IV | | | |
| V | | | |
| VI | 30,000 | | |
| VII | 52,600, 54,000 | | |
| VIII | 31,900 | | |
| IX | 20,500 | | |
| X | 5,900 | 0.928 | 294 |
| XI | 5,500 | | |

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

Propellant compositions can also be prepared using as an oxidizable material a boron-containing fuel such as the allylcarborane - vinylcarborane-isopropenylcarborane carboxylic acid terpolymer of this invention or a conventional fuel together with an oxidizer such as ammonium perchlorate and employing one or more of the products of this invention as a binder or fuel binder.

The following example illustrates the preparation of a solid propellant composition containing the terpolymer of this invention. In this case the allylcarborane-vinylcarborane-isopropenylcarborane carboxylic acid terpolymer is used as the solid fuel component.

EXAMPLE XII

Ammonium perchlorate, 80 grams, which had been predried at 80° C. in a vacuum oven, 20 grams of the terpolymer prepared in Example XI and 2.74 grams of "Epon 828" which is a condensation polymer of epichlorohydrin and bisphenol-A were placed in an 80 ml. capacity covered Brabender Plastograph (internal mixer) and blended for 2.5 hours at ambient temperature. Then 0.75 gram of toluene diisocyanate was added drop-wise to the mixture and the mixing continued under a nitrogen atmosphere for one-half hour at ambient temperature. The propellant mix was removed from the mixer and loaded into various shaped molds. The loaded molds were heated under vacuum at 95° C. for 25 minutes, the vacuum was broken by the addition of nitrogen and the temperature lowered to 75° C. Under these conditions the curing was continued for an additional 24 hours. After cooling to room temperature, the molds were removed and the cured slab was removed from the mold. The resulting slab was leathery material having the tensile strength and other properties suitable for use as a solid propellant.

EXAMPLE XIII

In this example the mix contained 25 grams of the terpolymer prepared in Example XI, 100 grams of ammonium perchlorate, 2.7 grams of Epon 828, 0.75 gram of a mixture of 80 percent 2,4-tolylene diisocyanate and 20 percent 2,6-tolylene diisocyanate sold under the trade name Nacconate 80. The terpolymer, perchlorate, and Epon 828 were mixed for one hour, the Nacconate 80 was added, and mixing was then continued for one-half hour. These operations were conducted under nitrogen at room temperature. Three experiments were performed with this mix. In the first two a cone shaped and a flat mold were each packed with the prepared mix and cured, first at 95° C. under vacuum for fifteen minutes, then at 95° C. for 1.5 hours, and finally for 20 hours at 65° C. Useful cured products with satisfactory tensile strength were obtained in both cases. In the third test a piece of tubing was firmly packed with the propellant mix and cured at 115° C. for 2.5 hours. A hard, ceramic-type piece was obtained.

A wide variety of propellant grains have been prepared in the manner described in Example XIII using the terpolymers of this invention. Table 3, which follows, gives the experimental details on the preparation of a number of such grains.

Table 3
PROPELLANT MIXES

| Mix | Terpolymer Used | | Ammonium Perchlorate, Grams | Epon 828, Grams | Nacconate 80,[a] Grams | Mixing | | Curing | | Product |
|---|---|---|---|---|---|---|---|---|---|---|
| | Source (Example No.) | Grams | | | | Hours | ° C. | Hours | ° C. | |
| A | XI | 20.0 | 80.0 | 2.74 | 0.75 | 1.5 | 50 | 24 | 75 | Pliable. |
| B | XI | 21.5 | 77.0 | 1.5 | | 1.5 | 50 | 24 | 80 | Do. |
| C | IX | 21.5 | 77.0 | 1.5 | 0.5 | 1.5 | 50 | 24 | 80 | Do. |
| D | XI | 21.5 | 76.5 | 1.5 | 0.5 | 2 | 50 | 24 | 80 | Do. |

[a] 80 percent 2,4-tolylene diisocyanate and 20 percent 2,6-tolylene diisocyanate.

What is claimed is:

1. A method for the preparation of an organoboron polymer which comprises copolymerizing allylcarborane, vinylcarborane and isopropenylcarborane carboxylic acid at a temperature of from 125° C. to 225° C., the molar ratio of the vinylcarborane to the allylcarborane being from about 1:5 to about 5:1 and the amount of isopropenylcarborane carboxylic acid employed being from about 1 to about 15 percent by weight based on the total weight of the allylcarborane and the vinylcarborane.

2. A method for the preparation of an organoboron polymer which comprises copolymerizing allylcarborane, vinylcarborane and isopropenylcarborane carboxylic acid in a bulk polymerization system at a temperature of from 125° C. to 225° C., the molar ratio of the vinylcarborane to the allylcarborane being from about 1:5 to about 5:1 and the amount of isopropenylcarborane carboxylic acid employed being from about 1 to about 15 percent by weight based on the total weight of the allylcarborane and the vinylcarborane.

3. A method for the preparation of an organoboron polymer which comprises copolymerizing allylcarborane, vinylcarborane and isopropenylcarborane carboxylic acid in a bulk polymerization system in the presence of a polymerization catalyst at a temperature of from 125° C. to 225° C., the molar ratio of the vinylcarborane to the allylcarborane being from about 1:5 to about 5:1 and the amount of isopropenylcarborane carboxylic acid employed being from about 1 to about 15 percent by weight based on the total weight of the allylcarborane and the vinylcarborane.

4. The method of claim 3 wherein the polymerization catalyst is tertiary butyl peroxide.

5. The product produced by the method of claim 1.

References Cited in the file of this patent
UNITED STATES PATENTS

| | | |
|---|---|---|
| 3,092,659 | Heying | June 4, 1963 |
| 3,093,687 | Clark et al. | June 11, 1963 |